Nov. 19, 1940.  H. R. JOHNSTON  2,222,075
BICYCLE STOP SIGNAL APPARATUS
Filed Oct. 3, 1938
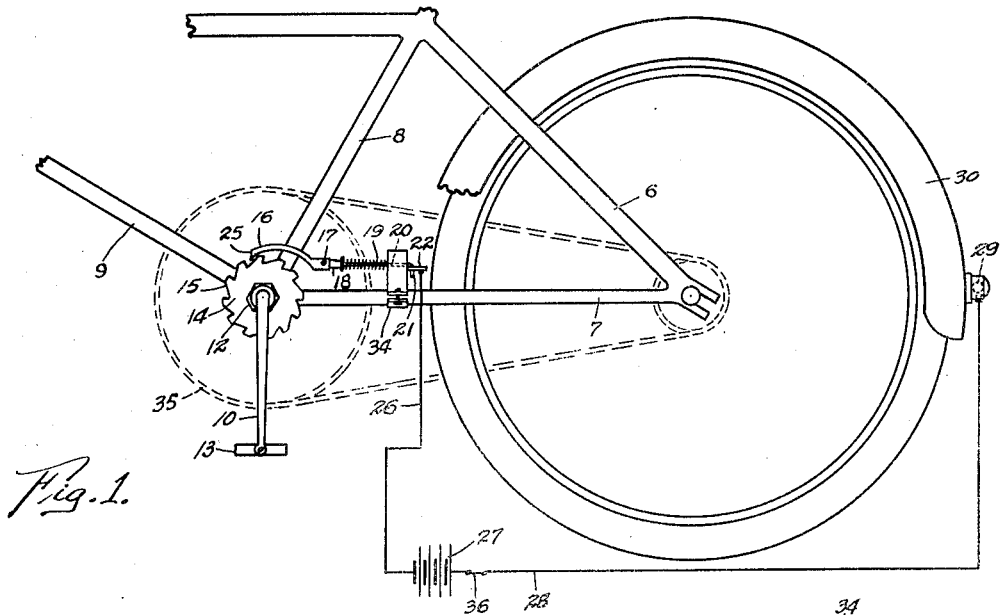
Fig. 1.
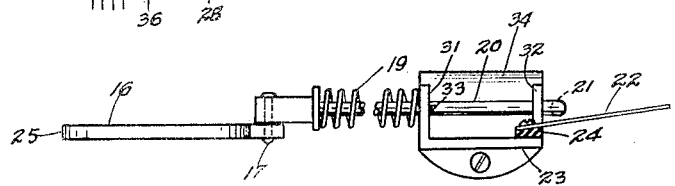
Fig. 2.
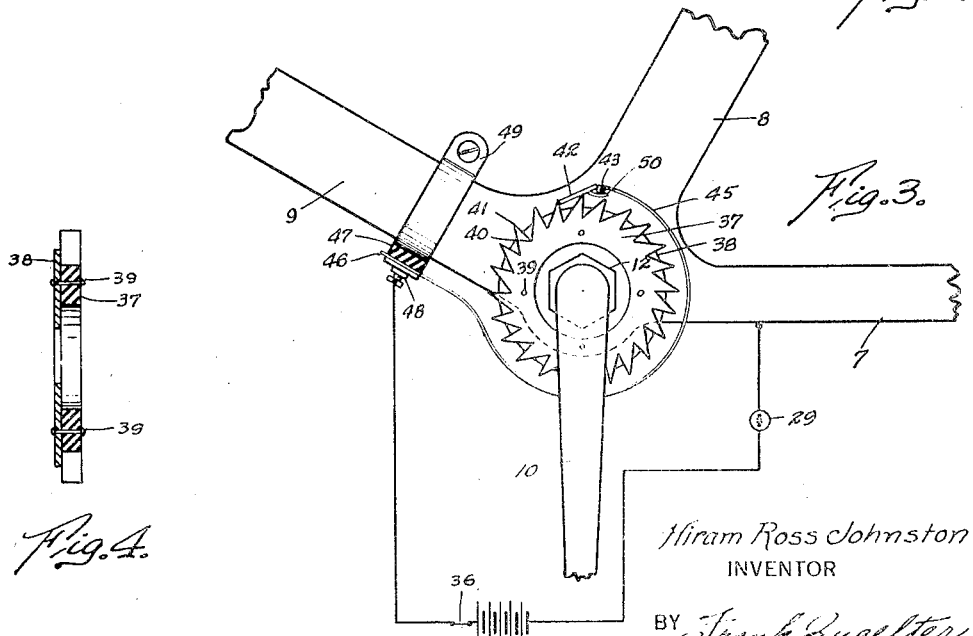
Fig. 3.
Fig. 4.
Hiram Ross Johnston
INVENTOR
BY Frank Zugelter
ATTORNEY Patented Nov. 19, 1940

2,222,075

UNITED STATES PATENT OFFICE 2,222,075

BICYCLE STOP SIGNAL APPARATUS

Hiram Ross Johnston, Hamilton, Ohio

Application October 3, 1938, Serial No. 233,012

8 Claims. (Cl. 177—339)

The present invention relates to a bicycle stop signal apparatus, the purpose of which it is to energize a signal whenever the direction of rotation of the driving sprocket is reversed by the cyclist in applying the brake.

An object of the invention is to provide a simple and inexpensive stop signal apparatus for bicycles which may be applied quickly and without the aid of a skilled mechanic, to any type or make of bicycle.

Another object of the invention is to provide an apparatus of the character stated, which is durable and effective, and which will operate in a satisfactory manner regardless of the variations in reverse movement of the driving sprocket occurring when the brake is applied.

Another object of the invention is to provide a bicycle stop light apparatus which is applicable to a bicycle in such manner that alterations in the construction of the bicycle, and special substitute parts, need not be resorted to in order to install the stop light apparatus.

The foregoing and other objects are attained by the means described herein and disclosed in the accompanying drawing, in which:

Fig. 1 is a fragmental side elevational view of a bicycle equipped with a device of the invention.

Fig. 2 is an enlarged plan view of the stop light apparatus disclosed in Fig. 1.

Fig. 3 is an enlarged side elevational view of a portion of a bicycle frame, to which is applied a modified form of the invention.

Fig. 4 is a vertical cross-section of a contactor which forms a detail of the Fig. 3 device.

With reference to the accompanying drawing, there is illustrated in Fig. 1 a bicycle frame comprising the rear wheel supports 6 and 7, and seat post frame element 8, and a lower steering post support 9, the elements 7, 8 and 9 converging in the customary manner to furnish a bearing for pedal hanger 10. It is commonplace to secure the hanger in place by means of a lock nut 12 which may be unscrewed and slid along the hanger 10, for removal, after disconnecting the pedal 13 from the hanger. This removal of the lock nut is all that is required in the way of disassembly of the driving mechanism, when installing the stop light apparatus upon the bicycle. A more detailed explanation concerning this will follow.

The character 14 indicates a ratchet wheel having a series of teeth or projections 15, over which a pivoted pawl 16 may ride during forward propulsion of the bicycle. The pawl may be pivoted as at 17 upon a connecting rod 18 which supports a compression spring 19, the spring preferably surrounding a core or rod 20 which comprises the connecting rod. The free end 21 of the rod or core 20 is turned downwardly as at 21, to form the movable element of a switch or contactor. The contact part 21 is adapted to be slid rearwardly so as to strike a second contact element 22, the latter being fixedly mounted upon a mounting plate or bracket 23, with an insulating separator therebetween. The contact element 22 preferably is of spring metal, and it is so mounted upon the insulating piece 24 as to extend across the path of rearward movement of contactor 21, at an acute angle. From the foregoing it should be understood that reversing the direction of pedal movement to apply the bicycle brake, will result in the abutting forward face 25 of pawl 16 being engaged by one of the teeth or extensions 15, thereby moving the rod 20 rearwardly, against the yielding resistance of spring 19, to cause contact 21 to strike and wipe the flexible contact element 22. This closes an electrical circuit through conductor 26, source of electricity 27, conductor 28, and lamp 29, the return path of electric transmission being by way of the fender 30, the bicycle frame, ratchet wheel 14, pawl 16, and rod 19. In other words, the device may operate through a grounded system, using but a single wire for energizing the lamp. It will be understood, of course, that suitable changes readily can be made by one skilled in the art for converting the system into a two wire system. The characters 31 and 32 indicate bearings on the mounting plate or bracket 23, through which the rod 20 may slide. A suitable stop 33 may be provided, if desired, to limit the extent to which spring 19 may return the pawl to its normal forward position, at which the movable contact 21 is withdrawn from circuit closing relationship with the stationary contact 22, to extinguish the lamp 29. A battery case switch 36, may be included in the electrical circuit, if desired.

In the form of device disclosed in Figs. 1 and 2, the ratchet wheel 14 would be of metal or other electricity conducting material, and it may be in the form of a simple sheet metal stamping perforated at its center, so that it may be slid onto the hanger 10 and held in place behind the lock nut 12. When the ratchet wheel is constructed of thin sheet metal, the metallic pawl 16 preferably is made sufficiently wide, at least at its forward free end, so that the pawl end will not run off of the ratchet wheel teeth.

The mounting plate or bracket 23 preferably has a clip 34 for attachment to the frame element 7 of the bicycle. The clip, if desired, may be made integral with the plate or bracket 23, although this particular detail is unimportant to the invention.

During forward propulsion of the bicycle, and when coasting, the pawl is always extended to its forward limit, thereby maintaining an open circuit relationship of the contacts 21 and 22. The contacts are closed, however, whenever the driving sprocket 35 is rotated in the reverse direction, for applying the brake, as previously explained.

The modified form of stop light apparatus disclosed in Figs. 3 and 4 is of unique construction, and may be preferable to the type of device just explained. In the modified form, the device comprises a ratchet wheel 37 made of fiber or other suitable insulating material, mounted upon a circular plate or disk 38 of electricity conducting material, these parts being riveted or otherwise secured together, as at 39 in flatwise relationship. The disk is of a diameter less than the overall diameter of the ratchet wheel, but is sufficiently large to extend outwardly of the bases 40 of the ratchet wheel teeth 41. The construction, therefore, is such that a hinged metallic pawl 42, pivoted at 43, will ride over outer ends of the teeth as the bicycle is propelled in a forward direction, without effecting an electrical connection or contact with the metallic plate or disk 38. Upon reversal of hanger movement, however, such as occurs when the brake is applied, the free end of pawl 42 will dip down between two adjacent teeth of the ratchet wheel, and will contact the metallic disk 38, thereby to close an electrical circuit through the lamp or signal 29. This dipping of the pawl is rendered possible by reason of the fact that the pawl is hinged upon a flexible pawl holder 45 of considerable resiliency, thereby to keep the circuit closed throughout a substantial amount of reverse rotation of the pedal hanger. To this end, the flexible pawl holder may be constructed of a rather long leaf spring shaped to a substantially circular formation, and having a free end 46 anchored to the frame of the bicycle. The pawl holder is insulated from the frame, as at 47, and it may include a binding post or connector 48 also insulated from the frame. The flexible pawl holder may be anchored as stated, by means of a clip 49.

From the foregoing, it will be understood that rotation of the hanger in clock-wise direction (Fig. 3) will cause the free end of pawl 42 to enter between adjacent ratchet wheel teeth sufficiently to make electrical contact with the disk 38, although rotation of the hanger in the opposite or bicycle propelling direction will never permit the pawl to enter between the teeth sufficiently to make contact with the conducting disc; nor will the pawl enter sufficiently to make the contact when the parts are at rest, because the pawl then rests upon the top of one of the teeth and can not therefore dip between the teeth.

The purpose of providing the resilient pawl holder 45, and shaping it as explained, is to allow for sufficient distortion thereof to take care of the various degrees of reverse movement of the hanger necessary to apply the coaster brake on different bicycles, since it is a matter of common knowledge that the wearing of parts in the different types of coaster brakes results in a change in the amount of reverse hanger movement required for applying the brake. By reason of the stated construction of the pawl holder, the pawl is permitted to follow the ratchet wheel around in the reverse direction of its rotation, and maintain the electrical contact, even though the hanger may have to reverse through a substantial arc to apply the brake. The pawl may be provided with a stop 50, or its equivalent, to limit the hinging movement thereof at its pivot. As is obvious, a proper pitch and shape of the ratchet teeth may make it unnecessary to pivot the pawl 42, in which case the adjacent end of the resilient pawl holder may simply be bent at a proper angle to secure the desired action above related.

In the device of Figs. 3 and 4, the disc 38 is of course, grounded by reason of its connection with the hanger, since the hanger lock nut furnishes the sole means of fixing the disc and its ratchet wheel to the hanger. Thus, the return of electricity to the battery may be by way of the ground, although it is obvious that a two-wire system could be substituted by making appropriate alterations within the skill of an ordinary electrician. The mounting of the ratchet wheel and contact disc unit as herein explained is a simple operation, and constitutes one of the meritorious advantages of the invention. The ratchet wheel of Fig. 1 may be similarly mounted, that is, by clamping it behind the hanger lock nut. Moreover, the invention contemplates the use of the Fig. 3 ratchet wheel in the Fig. 1 combination, as an alternative construction, for the reason that the grounding of the Fig. 1 ratchet wheel is unnecessary, due to the fact that a ground is established through rod 20, bracket 23 and clip 34, which are metal parts. The pawl 16 of Fig. 1, therefore, may be made of fiber or the like to reduce noise.

The electrical connections necessary for hooking up the elements of the circuit are clearly evident, and may be varied, of course, as to the unimportant details thereof.

It is to be understood that various modifications and changes in the structural details of the device may be made, within the scope of the appended claims, without departing from the spirit of the invention.

What is claimed is:

1. The combination with a bicycle having a brake, and a pedal hanger rotatable in one direction for propelling the bicycle, and in the reverse direction for applying the brake thereof, of a stop signal mounted upon the bicycle, a toothed ratchet wheel fixed relative to the pedal hanger for rotation therewith, a pawl supported upon the bicycle and having an engaging tooth element cooperating with the teeth of the ratchet wheel to engage between the teeth in opposition to a reverse movement of the pedal hanger, and means operative when the hanger is thusly reversed, to energize the stop signal.

2. The combination with a bicycle having a brake, and a pedal hanger rotatable in one direction for propelling the bicycle, and in the reverse direction for applying the brake thereof, of a stop signal including an electrically energizable element mounted upon the bicycle, a toothed ratchet wheel fixed relative to the pedal hanger for rotation therewith, a pawl abutting the teeth of the ratchet wheel so as to ride over the teeth as the hanger is rotated in the direction of bicycle propulsion, means on the bicycle for slidably supporting the pawl for reciprocating movement, and means yieldingly resisting the reciprocating movement of the pawl in one direction resulting from rotation of the hanger in the reverse direction, as above stated, by reason of the pawl engaging between the ratchet wheel teeth, an electrical switch contact reciprocable with the pawl, a stationary electrical switch contact of an elongated character to be struck and wiped upon movement of the movable contact resulting from reversal of the hanger movement, a source of electricity, and an electrical circuit including the source of electricity, the energizable element, the movable contact, and the stationary contact, said reciprocable switch and its associated pawl being returned to circuit breaking position upon rotation of the hanger in the direction of vehicle propulsion, by the action of the yielding means aforesaid.

3. The combinaion with a bicycle pedal hanger including a horizontal bearing portion about which the hanger is rotated for propelling the bicycle, of a centrally apertured toothed ratchet wheel of electricity insulating material to be slipped onto the hanger in concentric relationship to the horizontal bearing portion thereof, and a thin centrally apertured disc of electricity conducting material secured flatwise against the insulating ratchet wheel, so that the wheel and disc both may be slipped onto the hanger as stated, the periphery of the disc being exposed between the ratchet wheel teeth, and means for effecting an electrical contact between adjacent teeth of the ratchet wheel upon rotation of the hanger in one direction only.

4. The combination with a bicycle comprising a frame including a pedal hanger and a horizontal bearing therefor, whereby the hanger may be rotated in one direction for propelling the bicycle, and in the reverse direction for braking the bicycle, of a lock nut securing the hanger in position relative to said bearing, a centrally apertured toothed ratchet wheel of electricity insulating material, and a thin centrally apertured disc of electricity conducting material secured flatwise against the insulating ratchet wheel in concentric relationship, said central apertures permitting the wheel and disc to be slipped onto the hanger concentrically with the bearing portion thereof, with the disc clamped behind the lock nut of the hanger, a curved resilient leaf spring having opposite ends, said spring being formed into a part of a circle and of such diameter as to substantially encircle the periphery of the ratchet wheel, in spaced relationship, a metallic pawl hinged to one end of the spring and arranged to override the ratchet wheel teeth during forward propulsion of the bicycle, said pawl, upon reversal of the hanger rotation, engaging between two adjacent teeth of the ratchet wheel and dipping therebetween to contact the electricity conducting disc for closing an electrical circuit, means for anchoring the opposite end of the spring in insulated relationship to the bicycle frame, a stop lamp having one of its contacts grounded upon the bicycle frame, a source of electricity, and an electrical circuit including the source of electricity, the other stop lamp contact, the pawl, and the disc associated with the ratchet wheel, said disc being grounded by reason of its clamped relationship with the hanger lock nut.

5. The combination with a bicycle comprising a frame including a pedal hanger and a horizontal bearing therefor, whereby the hanger may be rotated in one direction for propelling the bicycle, and in the reverse direction for braking the bicycle, a toothed ratchet wheel of electricity insulating material, and a thin disc of electricity conducting material secured flatwise against the insulating ratchet wheel in concentric relationship, means fixing the wheel and disc relative to the hanger concentrically with the bearing portion thereof, a curved resilient leaf spring having opposite ends, said spring being formed into a part of a circle and of such diameter as to substantially encircle the periphery of the ratchet wheel, in spaced relationship, a metallic pawl hinged to one end of the spring and arranged to override the ratchet wheel teeth during forward propulsion of the bicycle, said pawl upon reversal of the hanger rotation, engaging between two adjacent teeth of the ratchet wheel and dipping therebetween to contact the electricity conducting disc for closing an electrical circuit, means for anchoring the opposite end of the spring in insulated relationship to the bicycle frame, a stop lamp having one of its contacts grounded upon the bicycle frame, a source of electricity, and an electrical circuit including the source of electricity, the other stop lamp contact, the pawl, and the disc associated with the ratchet wheel, said disc being grounded upon the bicycle frame.

6. The combination with a bicycle comprising a frame including a pedal hanger and a horizontal bearing therefor, whereby the hanger may be rotated in one direction for propelling the bicycle, and in the reverse direction for braking the bicycle, a toothed ratchet wheel of electricity insulating material, and a disc of electricity conducting material secured flatwise against the insulating ratchet wheel in concentric relationship with its periphery exposed between the ratchet wheel teeth, means fixing the wheel and disc relative to the hanger concentrically with the bearing portion thereof, a curved resilient leaf spring having opposite ends, said spring being formed into a part of a circle and of such diameter as to substantially encircle the periphery of the ratchet wheel, in spaced relationship, an electrical contact means on one end of the spring and arranged to override the ratchet wheel teeth during forward propulsion of the bicycle, said contact means, upon reversal of the hanger rotation, engaging between two adjacent teeth of the ratchet wheel and dipping therebetween to contact the electricity conducting disc for closing an electrical circuit, means for anchoring the opposite end of the spring in insulated relationship to the bicycle frame, a stop lamp having one of its contacts grounded upon the bicycle frame, a source of electricity, and an electrical circuit including the source of electricity, the other stop lamp contact, the contact means, and the disc associated with the ratchet wheel, said disc being grounded upon the bicycle frame.

7. The combination with a bicycle having a brake, and a pedal hanger rotatable in one direction for propelling the bicycle, and in the reverse direction for applying the brake thereof, of a stop signal mounted upon the bicycle, a toothed ratchet wheel fixed relative to the pedal hanger for rotation therewith, a pawl supported upon the bicycle and having an engaging tooth element cooperating with the teeth of the ratchet wheel to engage between the teeth in opposition to a reverse movement of the pedal hanger, and means including a long stroke electrical contact means operative when the hanger is thusly reversed, through different degrees of rotation, to energize the stop signal.

8. The combination with a bicycle pedal hanger including a horizontal bearing portion about which the hanger is rotated for propelling the bicycle, of a centrally apertured toothed ratchet wheel of electricity insulating material to be slipped onto the hanger in concentric relationship to the horizontal bearing portion thereof, and a thin centrally apertured disc of electricity conducting material mounted alongside of the insulating ratchet wheel in concentric relationship thereto, said disc being of a smaller diameter than the ratchet wheel but sufficiently large to have its periphery exposed between consecutive teeth of the ratchet wheel, a pawl of electricity conducting material adapted to ride upon the teeth of the ratchet wheel out of contact with the disc upon rotation of the hanger in the bicycle propelling direction of rotation, resilient means associated with the pawl adapted to yield to a compressive force imposed upon the pawl by the ratchet wheel teeth when the hanger is rotated in the reverse direction, allowing the pawl to dip between the teeth into electrical contact with the disc periphery, and an electrical circuit including the pawl and the disc, to be completed by the dipping of the pawl as stated.

HIRAM ROSS JOHNSTON.